(12) United States Patent
Hironaka

(10) Patent No.: US 8,366,207 B2
(45) Date of Patent: Feb. 5, 2013

(54) BRAKE HYDRAULIC PRESSURE CONTROL APPARATUS

(75) Inventor: Hideharu Hironaka, Anjo (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 251 days.

(21) Appl. No.: 12/869,108

(22) Filed: Aug. 26, 2010

(65) Prior Publication Data

US 2011/0049970 A1    Mar. 3, 2011

(30) Foreign Application Priority Data

Aug. 31, 2009  (JP) .................................. 2009-199336

(51) Int. Cl.
*B60T 8/36* (2006.01)
(52) U.S. Cl. .................................. 303/119.2; 303/116.1
(58) Field of Classification Search .................... 303/10, 303/115.4, 116.1, 116.2, 116.4, 119.2; 251/129.02, 251/129.15
See application file for complete search history.

(56) References Cited

U.S. PATENT DOCUMENTS

| 6,808,160 B2 * | 10/2004 | Hayakawa et al. ...... 251/129.02 |
| 2004/0207252 A1 | 10/2004 | Woll |
| 2005/0006951 A1 * | 1/2005 | Schwarzer et al. ........ 303/119.2 |
| 2006/0181143 A1 | 8/2006 | Yamamoto |
| 2007/0057570 A1 * | 3/2007 | Yamamoto ........................ 303/3 |
| 2008/0238186 A1 * | 10/2008 | Suzuki et al. ................... 303/20 |

FOREIGN PATENT DOCUMENTS

| JP | 2005-162176 A | 6/2005 |
| JP | 2008-247354 A | 10/2008 |

* cited by examiner

*Primary Examiner* — Christopher Schwartz
(74) *Attorney, Agent, or Firm* — Buchanan Ingersoll & Rooney PC

(57) ABSTRACT

A brake hydraulic pressure control apparatus includes a reservoir, a brake hydraulic pressure supply device, a hydraulic pump, a plurality of wheel cylinders, a cut valve, a plurality of pressure-increasing solenoid valves, a plurality of pressure-decreasing solenoid valves, a discharge passage including a plurality of relief passages and a circulating passage, a controlling device bringing a brake hydraulic pressure to be applied to the wheel cylinders from the hydraulic pump by disconnecting the brake hydraulic pressure supply device from the wheel cylinders by the cut valve while the pressure-increasing solenoid valves are in an open state, and bringing the brake fluid within the wheel cylinders to be circulated to the reservoir via the discharge passage by operating the pressure-decreasing solenoid valves, and a pulsation transmission decreasing device provided at the discharge passage and decreasing a transmission of a pressure pulsation generated by at least one of the pressure-decreasing solenoid valves.

7 Claims, 7 Drawing Sheets

US 8,366,207 B2

BRAKE HYDRAULIC PRESSURE CONTROL APPARATUS

CROSS REFERENCE TO RELATED APPLICATIONS

This application is based on and claims priority under 35 U.S.C. §119 to Japanese Patent Application 2009-199336, filed on Aug. 31, 2009, the entire content of which is incorporated herein by reference.

TECHNICAL FIELD

This disclosure relates to a brake hydraulic pressure control apparatus.

BACKGROUND DISCUSSION

A known brake hydraulic pressure control apparatus controlling a hydraulic pressure of a wheel cylinder by means of a linear solenoid valve is disclosed in JP2005-162176A (which will be hereinafter referred to as Reference 1). The brake hydraulic pressure control apparatus disclosed in Reference 1 includes a master cylinder pressurizing a brake fluid within a reservoir by a brake pedal operation, cut valves arranged between the master cylinder and wheel cylinders, and a hydraulic pressure supply source including a hydraulic pump for applying a brake hydraulic pressure to the wheel cylinders. The brake hydraulic pressure control apparatus further includes pressure-increasing solenoid valves each formed by a linear solenoid valve and arranged between the hydraulic pressure supply source and the respective wheel cylinders. The wheel cylinders are connected to the reservoir via pressure-decreasing solenoid valves each formed by a linear solenoid valve.

In the brake hydraulic pressure control apparatus disclosed in Reference 1, when the brake pedal is operated in a state where the hydraulic pressure supply source is normally operated, the cut valves disconnect the master cylinder and the wheel cylinders from each other. The hydraulic pressure generated by the hydraulic pressure supply source is regulated and increased to a predetermined value by the pressure-increasing solenoid valves, and is applied to the wheel cylinders. In addition, the brake fluid at each of the wheel cylinders is discharged to the reservoir by operations of the pressure-decreasing solenoid valves so as to control the brake hydraulic pressure within the wheel cylinders in response to the operation of the brake pedal. The brake hydraulic pressure control apparatus disclosed in Reference 1 may include a buffer between the hydraulic pump and the reservoir so as to restrain an extreme decrease of an internal pressure of each of the pressure-decreasing solenoid valves caused by the pump operation. Such brake hydraulic pressure control apparatus is disclosed in JP2008-247354A (which will be hereinafter referred to as Reference 2).

According to the brake hydraulic pressure control apparatus disclosed in Reference 1, relief passages are connected to the respective pressure-decreasing solenoid valves. End portions of the relief passages are connected to a single circulating passage within a housing unit. The circulating passage is connected to the reservoir. The brake hydraulic pressure within each of the wheel cylinders is controlled or adjusted by the pressure-increasing solenoid valves and the pressure-decreasing solenoid valves formed by the linear solenoid valves. Such control is obtained by an adjustment of a valve opening of each of the solenoid valves that is achieved by means of a load balance between an electromagnetic force of a solenoid acting on a valve element, a pressure difference of the brake fluid, and a biasing force of biasing means. Specifically, according to each of the pressure-decreasing solenoid valves, because the valve element is brought to separate from a valve seat, the aforementioned load balance tends to deteriorate and an oscillation of the valve element (i.e., a self-oscillation) may occur. The self-oscillation that occurs at one of the pressure-decreasing solenoid valves causes pulsation of pressure at the relief passage to which the aforementioned pressure-decreasing solenoid valve is connected. The pressure pulsation that occurs at the aforementioned relief passage is transmitted to the other pressure-decreasing solenoid valves formed at the other relief passages. Accordingly, the load balance of the valve element in the other pressure-decreasing solenoid valve that receives the pressure pulsation may be deteriorated and the self-oscillation may occur, which leads to a cause of an operation noise (abnormal noise) of the brake hydraulic pressure control apparatus.

In addition, aeration in which air dissolved in the brake fluid turns to air bubbles in a valve chamber where the valve element is accommodated causes the self-oscillation of the valve element because of insufficient attenuation of the oscillation of the valve element. In such case, the self-oscillation generated at one of the pressure-decreasing solenoid valves is transmitted to the other pressure-decreasing solenoid valve(s), which leads to a cause of the operation noise of the brake hydraulic pressure control apparatus.

According to the brake hydraulic pressure control apparatus disclosed in Reference 1 where the cut valves disconnect the master cylinder from the wheel cylinders and the brake hydraulic pressure applied to the wheel cylinders from the hydraulic pump is controlled by the pressure-increasing solenoid valves and the pressure-decreasing solenoid valves formed by the linier solenoid valves, it is necessary to control the brake hydraulic pressure within each of the wheel cylinders without a generation of the operation noise upon brake operation under a normal driving condition of the vehicle. Thus, prevention of the operation noise upon operation of the brake hydraulic pressure control apparatus is an important issue in regards to the function of the brake hydraulic pressure control apparatus.

In order to decrease an occurrence of self-oscillation of the pressure-decreasing solenoid valve, the buffer is provided between the hydraulic pump and the reservoir so that the extreme decrease of the internal pressure of the pressure-decreasing solenoid valve caused by the pump operation is restrained as disclosed in Reference 2. However, the resulting structure is complicated, which leads to an increase of size and cost of the brake hydraulic pressure control apparatus.

A need thus exists for a brake hydraulic pressure control apparatus which is not susceptible to the drawback mentioned above.

SUMMARY

According to an aspect of this disclosure, a brake hydraulic pressure control apparatus includes a reservoir storing a brake fluid at an inner portion connected to atmospheric air, a brake hydraulic pressure supply device connected to the reservoir and pressurizing the brake fluid that is supplied by the reservoir in response to an operation of a brake pedal, a hydraulic pump suctioning the brake fluid within the reservoir and discharging the brake fluid having a predetermined brake hydraulic pressure, a plurality of wheel cylinders provided at a plurality of wheels of a vehicle respectively and connected to the brake hydraulic pressure supply device, each of the plurality of wheel cylinders generating a braking force at each of the wheels by receiving the brake hydraulic pressure from the hydraulic pump, a cut valve provided between the brake hydraulic pressure supply device and the plurality of wheel cylinders and disconnecting the brake hydraulic pressure supply device from the plurality of wheel cylinders, a plurality of pressure-increasing solenoid valves provided between the hydraulic pump and the respective wheel cylinders, the plurality of pressure-increasing solenoid valves connecting and disconnecting the hydraulic pump relative to the respective wheel cylinders by opening and closing, a plurality of pressure-decreasing solenoid valves connected to the respective wheel cylinders and opening and closing, the pressure-decreasing solenoid valves being formed by linear solenoid valves respectively, a discharge passage including a plurality of relief passages of which first ends are connected to downstream sides of the pressure-decreasing solenoid valves respectively and a circulating passage connecting second ends of the plurality of relief passages to the reservoir, a controlling device controlling the brake fluid within the wheel cylinders to be a predetermined value in response to an operating level of the brake hydraulic pressure supply device in a case where the brake hydraulic pressure supply device is operated, the controlling device bringing the brake hydraulic pressure to be applied to the wheel cylinders from the hydraulic pump by disconnecting the brake hydraulic pressure supply device from the wheel cylinders by the cut valve while the pressure-increasing solenoid valves are each in an open state, and bringing the brake fluid within the wheel cylinders to be circulated to the reservoir via the discharge passage by operating the pressure-decreasing solenoid valves, and a pulsation transmission decreasing device provided at the discharge passage and decreasing a transmission of a pressure pulsation generated by at least one of the pressure-decreasing solenoid valves.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
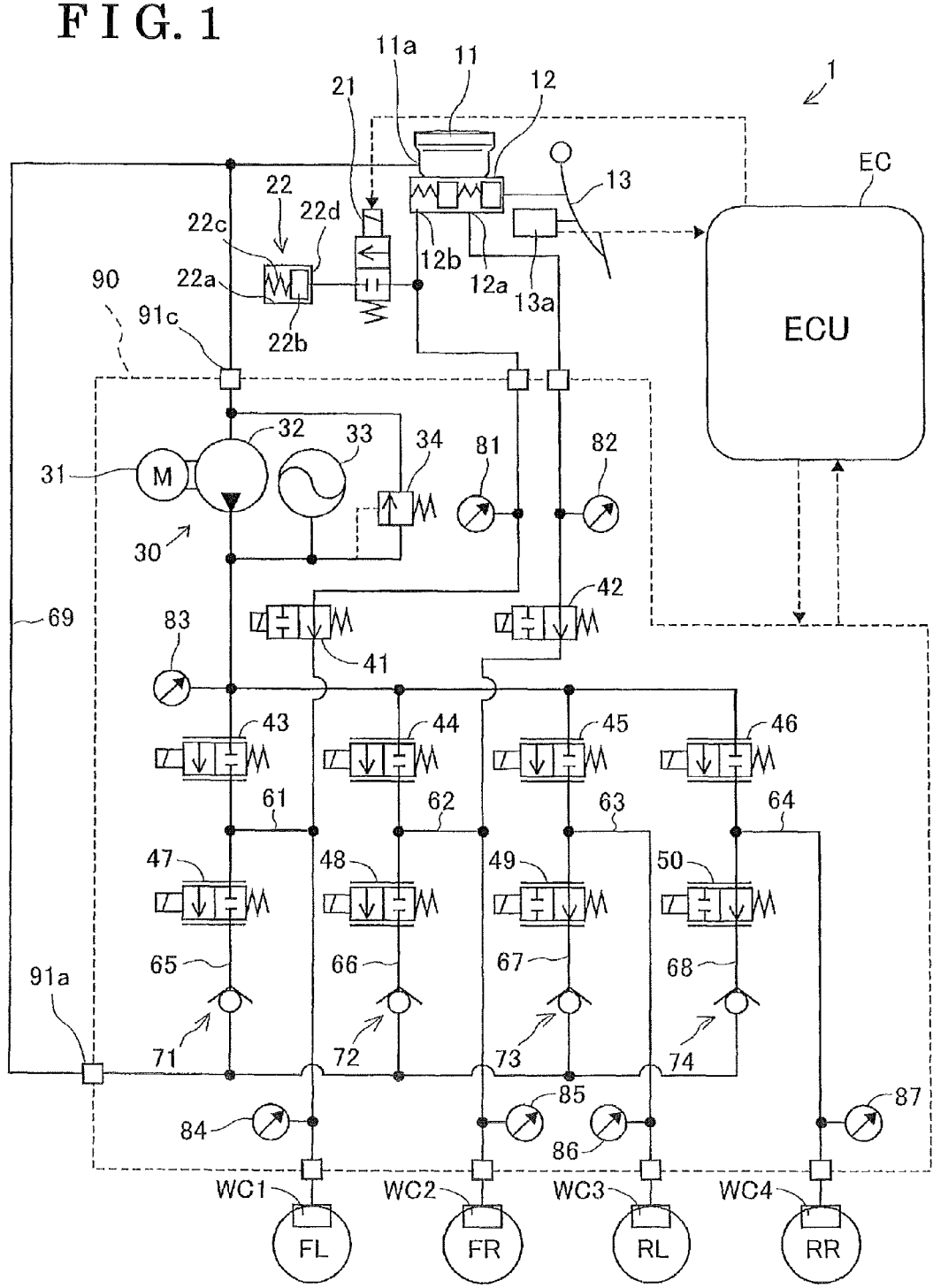
FIG. 1 is a diagram illustrating a brake hydraulic pressure control apparatus according to a first embodiment disclosed here.

A first embodiment disclosed here will be explained with reference to FIG. 1. A brake hydraulic pressure control apparatus 1 is so-called a brake-by-wire type. The brake hydraulic pressure control apparatus 1 includes a master cylinder reservoir 11 serving as a reservoir and a master cylinder 12 serving as a brake hydraulic pressure supply device. The master cylinder reservoir 11 stores a brake fluid at an inner portion connected to atmospheric air. The master cylinder 12 is connected to the master cylinder reservoir 11.

The master cylinder 12 pressurizes the brake fluid in the master cylinder reservoir 11 in response to an amount of depression of a brake pedal 13 so that the brake fluid at the same pressure value is discharged to both a primary port 12a and a secondary port 12b. A stroke sensor 13a is attached to the brake pedal 13 so as to detect the amount of depression of the brake pedal 13.

A stroke simulator 22 is connected to the secondary port 12b of the master cylinder 12 via an on-off valve 21. The on-off valve 21 is a normally closed electromagnetic valve and is able to disconnect the secondary port 12b and the stroke simulator 22 from each other. The stroke simulator 22 includes a cylinder 22a in which a piston 22b is movably accommodated. Then, a compression spring 22c is disposed between an end surface of the piston 22b and the cylinder 22a. The piston 22b is fluid-tightly fitted to the cylinder 22a so that a hydraulic chamber 22d is defined within the cylinder 22a. The hydraulic chamber 22d is connected to the secondary port 12b when the on-off valve 21 is in an open state.

In a case where the on-off valve 21 is in the open state, a brake hydraulic pressure generated at the secondary port 12b is applied to the hydraulic chamber 22d to thereby move the piston 22b within the cylinder 22a while the compression spring 22c is being deflected or compressed. Then, the depression amount of the brake pedal 13 and a reaction force against the brake pedal 13 appropriate for the generated brake hydraulic pressure at the secondary port 12b are obtained.

A suction port of a hydraulic pump 32 of a hydraulic pressure supply source 30 is connected to an input port 11a of the master cylinder reservoir 11 via an inlet port 91c formed at an outer peripheral surface of a housing unit 90 (which will be explained later). The hydraulic pump 32 is driven by an electric motor 31 so as to suction the brake fluid within the master cylinder reservoir 11 and discharges the brake fluid having a predetermined brake hydraulic pressure. The hydraulic pressure supply source 30 also includes an accumulator 33 accumulating the brake hydraulic pressure obtained by the hydraulic pump 32 and a relief valve 34 that is able to return the brake fluid at a discharge side of the hydraulic pump 32 to the master cylinder reservoir 11. The relief valve 34 is normally in a closed state. In a case where the pressure of the brake fluid discharged from the hydraulic pump 32 is equal to or greater than a predetermined value, the relief valve 34 is brought to the open state.

A front-left wheel cylinder WC1, a front-right wheel cylinder WC2, a rear-left wheel cylinder WC3, and a rear-right wheel cylinder WC4 (which will be hereinafter collectively referred to as wheel cylinders WC1 to WC4) are provided at a front-left wheel FL, a front-right wheel FR, a rear-left wheel RL, and a rear-right wheel RR (which will be hereinafter collectively referred to as wheels FL, FR, RL, and RR), respectively, of a vehicle. The wheel cylinder WC1 provided at the front-left wheel FL is connected to the secondary port 12b of the master cylinder 12. The wheel cylinder WC2 provided at the front-right wheel FR is connected to the primary port 12a of the master cylinder 12.

The wheel cylinders WC1 to WC4 are connected to the hydraulic pressure supply source 30 so that the brake hydraulic pressure is applied to the wheel cylinders WC1 to WC4 from the hydraulic pump 32 or the accumulator 33 of the hydraulic pressure supply source 30. The wheel cylinders WC1 to WC4 then generate the braking force for the corresponding wheels FL, FR, RL, and RR.

A first cut valve 41 is provided between the wheel cylinder WC1 and the secondary port 12b of the master cylinder 12. The first cut valve 41 is a normally open electromagnetic valve and is closed while operating. The first cut valve 41 disconnects the wheel cylinder WC1 and the secondary port 12b from each other. In addition, a second cut valve 42 is provided between the wheel cylinder WC2 and the primary port 12a of the master cylinder 12. The second cut valve 42 is a normally open electromagnetic valve and is closed while operating. The second cut valve 42 disconnects the wheel cylinder WC2 and the primary port 23a from each other. The first cut valve 41 and the second cut valve 42 serve as cut valves.

A first pressure-increasing solenoid valve 43 is provided between the wheel cylinder WC1 and a discharge port of the hydraulic pump 32 of the hydraulic pressure supply source 30. The first pressure-increasing solenoid valve 43 is a normally-closed linear solenoid valve and is brought to the open state and the closed state when operating. The first pressure-increasing solenoid valve 43 connects and disconnects the wheel cylinder WC1 and the hydraulic pump 32 with each other. The first pressure-increasing solenoid valve 43 controls a drive current supplied to a solenoid that is provided at the first pressure-increasing solenoid valve 43, to thereby control or adjust an amount of brake fluid supplied to the wheel cylinder WC1 from the hydraulic pump 32.

A second pressure-increasing solenoid valve 44 is provided between the wheel cylinder WC2 and the hydraulic pump 32. The second pressure-increasing solenoid valve 44 is also a normally-closed linear solenoid valve and is brought to the open state and the closed state when operating. The second pressure-increasing solenoid valve 44 connects and disconnects the wheel cylinder WC2 and the hydraulic pump 32 with each other. The second pressure-increasing solenoid valve 44 controls the drive current supplied to a solenoid that is provided at the second pressure-increasing solenoid valve 44 to thereby control or adjust an amount of brake fluid supplied to the wheel cylinder WC2 from the hydraulic pump 32.

A third pressure-increasing solenoid valve 45 is provided between the wheel cylinder WC3 and the hydraulic pump 32. The third pressure-increasing solenoid valve 45 is also a normally-closed linear solenoid valve and is brought to the open state and the closed state when operating. The third pressure-increasing solenoid valve 45 connects and disconnects the wheel cylinder WC3 and the hydraulic pump 32 with each other. The third pressure-increasing solenoid valve 45 controls the drive current supplied to a solenoid that is provided at the third pressure-increasing solenoid valve 45 to thereby control or adjust an amount of brake fluid supplied to the wheel cylinder WC3 from the hydraulic pump 32.

A fourth pressure-increasing solenoid valve 46 is provided between the wheel cylinder WC4 and the hydraulic pump 32. The fourth pressure-increasing solenoid valve 46 is also a normally-closed linear solenoid valve and is brought to the open state and the closed state when operating. The fourth pressure-increasing solenoid valve 46 connects and disconnects the wheel cylinder WC4 and the hydraulic pump 32 with each other. The fourth pressure-increasing solenoid valve 46 controls the drive current supplied to a solenoid that is provided at the fourth pressure-increasing solenoid valve 46 to thereby control an amount of brake fluid supplied to the wheel cylinder WC4 from the hydraulic pump 32. The aforementioned first pressure-increasing solenoid valve 43, the second pressure-increasing solenoid valve 44, the third pressure-increasing solenoid valve 45, and the fourth pressure-increasing solenoid valve 46 serve as pressure-increasing solenoid valves.

A first pressure-decreasing solenoid valve 47 is connected to the wheel cylinder WC1 via a first wheel cylinder passage 61. The first pressure-decreasing solenoid valve 47, a second pressure-decreasing solenoid valve 48, a third pressure-decreasing solenoid valve 49, and a fourth pressure-decreasing solenoid valve 50, which will be explained later, serve as pressure-decreasing solenoid valves. One end of a first relief passage 65 is connected to a downstream side of the first pressure-decreasing solenoid valve 47. The first relief passage 65, a second relief passage 66, a third relief passage 67, and a fourth relief passage 68, which will be explained later, serve as relief passages.

The other end of the first relief passage 65 is connected to a circulating passage 69. The circulating passage 69 is connected to the input port 11a of the master cylinder reservoir 11. The aforementioned first relief passage 65, the second relief passage 66, the third relief passage 67, the fourth relief passage 68, and the circulating passage 69 collectively serve as a discharge passage.

A first check valve 71 is provided at the first relief passage 65 so as to allow the brake fluid to flow in a direction from the first pressure-decreasing solenoid valve 47 to the circulating passage 69 and to prohibit the brake fluid to flow in an opposite direction from the circulating passage 69 to the first pressure-decreasing solenoid valve 47. The first check valve 71 according to the first embodiment includes a ball valve that is freely movable within a valve chamber (which will be explained later). The first check valve 71 is a one-way valve that is opened by the brake fluid flowing in the direction from the first pressure-decreasing solenoid valve 47 to the circulating passage 69 and that is closed by the brake fluid flowing in the direction from the circulating passage 69 to the first pressure-decreasing solenoid valve 47. The first check valve 71, a second check valve 72, a third check valve 73, and a fourth check valve 74, which will be explained later, serve as a pulsation transmission decreasing device and check valves.

The aforementioned first pressure-decreasing solenoid valve 47 is a normally-closed linear solenoid valve. The first pressure-decreasing solenoid valve 47 is operated to open and close so as to connect and disconnect the wheel cylinder WC1 and the circulating passage 69 with each other. The first pressure-decreasing solenoid valve 47 controls the drive current supplied to a solenoid to thereby adjust the amount of brake fluid discharged to the master cylinder reservoir 11 from the wheel cylinder WC1 via the circulating passage 69.

The second pressure-decreasing solenoid valve 48 is connected to the wheel cylinder WC2 via a second wheel cylinder passage 62. One end of the second relief passage 66 is connected to a downstream side of the second pressure-decreasing solenoid valve 48. The other end of the second relief passage 66 is connected to the circulating passage 69. Then, the second check valve 72 is provided at the second relief passage 66 so as to allow the brake fluid to flow in a direction from the second pressure-decreasing solenoid valve 48 to the circulating passage 69 and to prohibit the brake fluid to flow in an opposite direction from the circulating passage 69 to the second pressure-decreasing solenoid valve 48. The second check valve 72 according to the first embodiment includes a ball valve that is freely movable within a valve chamber. The second check valve 72 is a one-way valve that is opened by the brake fluid flowing in the direction from the second pressure-decreasing solenoid valve 48 to the circulating passage 69 and that is closed by the brake fluid flowing in the direction from the circulating passage 69 to the second pressure-decreasing solenoid valve 48.

The aforementioned second pressure-decreasing solenoid valve 48 is a normally-closed linear solenoid valve. The second pressure-decreasing solenoid valve 48 is operated to open and close so as to connect and disconnect the wheel cylinder WC2 and the circulating passage 69 with each other. The second pressure-decreasing solenoid valve 48 controls the drive current supplied to a solenoid to thereby adjust the amount of brake fluid discharged to the master cylinder reservoir 11 from the wheel cylinder WC2 via the circulating passage 69.

The third pressure-decreasing solenoid valve 49 is connected to the wheel cylinder WC3 via a third wheel cylinder passage 63. One end of the third relief passage 67 is connected to a downstream side of the third pressure-decreasing solenoid valve 49. The other end of the third relief passage 67 is connected to the circulating passage 69. Then, the third check valve 73 is provided at the third relief passage 67 so as to allow the brake fluid to flow in a direction from the third pressure-decreasing solenoid valve 49 to the circulating passage 69 and to prohibit the brake fluid to flow in an opposite direction from the circulating passage 69 to the third pressure-decreasing solenoid valve 49. The third check valve 73 according to the first embodiment includes a ball valve that is freely movable within a valve chamber. The third check valve 73 is a one-way valve that is opened by the brake fluid flowing in the direction from the third pressure-decreasing solenoid valve 49 to the circulating passage 69 and that is closed by the brake fluid flowing in the direction from the circulating passage 69 to the third pressure-decreasing solenoid valve 49.

The aforementioned third pressure-decreasing solenoid valve 49 is a normally-open linear solenoid valve. The third pressure-decreasing solenoid valve 49 is operated to open and close so as to connect and disconnect the wheel cylinder WC3 and the circulating passage 69 with each other. The third pressure-decreasing solenoid valve 49 controls the drive current supplied to a solenoid to thereby adjust the amount of brake fluid discharged to the master cylinder reservoir 11 from the wheel cylinder WC3 via the circulating passage 69.

The fourth pressure-decreasing solenoid valve 50 is connected to the wheel cylinder WC4 via a fourth wheel cylinder passage 64. One end of the fourth relief passage 68 is connected to a downstream side of the fourth pressure-decreasing solenoid valve 50. The other end of the fourth relief passage 68 is connected to the circulating passage 69. Then, the fourth check valve 74 is provided at the fourth relief passage 68 so as to allow the brake fluid to flow in a direction from the fourth pressure-decreasing solenoid valve 50 to the circulating passage 69 and to prohibit the brake fluid to flow in an opposite direction from the circulating passage 69 to the fourth pressure-decreasing solenoid valve 50. The fourth check valve 74 according to the first embodiment includes a ball valve that is freely movable within a valve chamber. The fourth check valve 74 is a one-way valve that is opened by the brake fluid flowing in the direction from the fourth pressure-decreasing solenoid valve 50 to the circulating passage 69 and that is closed by the brake fluid flowing in the direction from the circulating passage 69 to the fourth pressure-decreasing solenoid valve 50.

The aforementioned fourth pressure-decreasing solenoid valve 50 is a normally-open linear solenoid valve. The fourth pressure-decreasing solenoid valve 50 is operated to open and close so as to connect and disconnect the wheel cylinder WC4 and the circulating passage 69 with each other. The fourth pressure-decreasing solenoid valve 50 controls the drive current supplied to a solenoid to thereby adjust the amount of brake fluid discharged to the master cylinder reservoir 11 from the wheel cylinder WC4 via the circulating passage 69.

Hereinafter, the first pressure-decreasing solenoid valve 47, the second pressure-decreasing solenoid valve 48, the third pressure-decreasing solenoid valve 49, and the fourth pressure-decreasing solenoid valve 50 will be referred to as the pressure-decreasing solenoid valves 47 to 50 when being described collectively. In addition, the first wheel cylinder passage 61, the second wheel cylinder passage 62, the third wheel cylinder passage 63, and the fourth wheel cylinder passage 64 will be referred to as the wheel cylinder passages 61 to 64 when being described collectively. Further, the first relief passage 65, the second relief passage 66, the third relief passage 67, and the fourth relief passage 68 will be referred to as the relief passages 65 to 68 when being described collectively. Still further, the first check valve 71, the second check valve 72, the third check valve 73, and the fourth check valve 74 will be referred to as the check valves 71 to 74 when being described collectively.

A hydraulic sensor 81 is provided at a conduit connecting the secondary port 12*b* of the master cylinder 12 and the first cut valve 41. The hydraulic sensor 81 detects a pressure value of the brake fluid discharged from the secondary port 12*b*. In the same way, a hydraulic sensor 82 provided at a conduit connecting the primary port 12*a* of the master cylinder 12 and the second cut valve 42 detects a pressure value of the brake fluid discharged from the primary port 12*a*. A hydraulic sensor 83 provided at a conduit connecting the discharge port of the hydraulic pump 32 and the pressure-increasing solenoid valves 43 to 46 detects a pressure value of the brake fluid discharged from the hydraulic pump 32 or the accumulator 33. Hydraulic sensors 84, 85, 86, and 87 provided at the wheel cylinder passages 61 to 64, respectively, detect pressure values of the brake fluid at the wheel cylinders WC1 to WC4, respectively.

The housing unit 90 illustrated in FIG. 1 is made of aluminum alloy, or the like. The hydraulic pressure supply source 30, the cut valves 41, 42, the pressure-increasing solenoid valves 43 to 46, the pressure-decreasing solenoid valves 47 to 50, the check valves 71 to 74, and the like are assembled within the housing unit 90 while constituting the brake hydraulic pressure control apparatus 1. Then, conduits connecting the aforementioned components with each other are formed within the housing unit 90. At this time, the hydraulic pressure supply source 30 may be separately formed from the housing unit 90.

The circulating passage 69 is connected to the relief passages 65 to 68 within the housing unit 90. The circulating passage 69 extends through an inner portion of the housing unit 90 and projects therefrom so as to be connected to the input port 11*a* of the master cylinder reservoir 11 outside of the housing unit 90. In practice, a first drain port 91*a*, formed at the outer peripheral surface of the housing unit 90, and the input port 11*a* are connected by a brake hose made of synthetic rubber, a metallic brake tube, or the like.

The stroke sensor 13*a*, the on-off valve 21, the electric motor 31, the cut valves 41, 42, the pressure-increasing solenoid valves 43 to 46, the pressure-decreasing solenoid valves 47 to 50, and the hydraulic sensors 81 to 87 are electrically connected to a controller EC serving as controlling means. A vehicle speed sensor detecting a speed of the vehicle, a wheel speed sensor detecting the speed of each of the wheels FL, FR, RL, and RR, a steering sensor detecting a steering angle of the vehicle, a shift switch detecting a shift position of a transmission of the vehicle, an acceleration sensor detecting an acceleration opening of the vehicle, a yaw rate sensor detecting a yaw rate of the vehicle, and the like are also connected to the controller EC.

Next, an operation control method of the brake hydraulic pressure control apparatus 1 will be explained below. In a case where a driver of the vehicle operates the brake pedal 13 under a normal operation of the hydraulic pressure supply source 30, the controller EC controls the cut valves 41 and 42 to be in the closed state so as to disconnect the secondary port 12*b* of the master cylinder 12 from the wheel cylinder WC1 provided at the front-left wheel FL, and the primary port 12*a* of the master cylinder 12 from the wheel cylinder WC2 provided at the front-right wheel FR. At the same time, the controller EC controls the on-off valve 21 to be in the open state so as to connect the secondary port 12*b* of the master cylinder 12 to the stroke simulator 22.

In the aforementioned state, the controller EC drives the hydraulic pump 32 and controls the pressure-increasing solenoid valves 43 to 46 to open, thereby supplying the brake fluid from the hydraulic pump 32 to the wheel cylinders WC1 to WC4. In addition, the controller EC controls the pressure-decreasing solenoid valves 47 to 50 to open so that the brake fluid supplied to the wheel cylinders WC1 to WC4 is discharged to the master cylinder reservoir 11 via the wheel cylinder passages 61 to 64, the pressure-decreasing solenoid valves 47 to 50, the relief passages 65 to 68, the check valves 71 to 74, and the circulating passage 69. As a result, the brake fluid at the wheel cylinders WC1 to WC4 is reduced.

The controller EC controls the brake hydraulic pressure within each of the wheel cylinders WC1 to WC4 to a predetermined value based on the depression amount of the brake pedal 13 detected by the stroke sensor 13*a* and the pressure value detected by each of the hydraulic sensors 81 to 87 so that the braking force is generated at each of the wheels FL, FR, RL and RR depending on the depression amount of the brake pedal (i.e., a normal brake control).

As mentioned above, the pressure-increasing solenoid valves 43 to 46 and the pressure-decreasing solenoid valves 47 to 50 are formed by the linear solenoid valves. For example, the adjustment of the drive current supplied to each of the pressure-increasing solenoid valves 43 to 46 and the pressure-decreasing solenoid valves 47 to 50 by a duty control achieves a control of the amount of brake fluid supplied to the wheel cylinders WC1 to WC4 from the hydraulic pressure supply source 30 and the amount of brake fluid discharged to the master cylinder reservoir 11 from the wheel cylinders WC1 to WC4. A pressure-increasing gradient and a pressure-decreasing gradient of each of the wheel cylinders WC1 to WC4 are adjustable accordingly.

On the other hand, in a case where the brake pedal 13 is operated under a condition where the hydraulic pressure supply source 30 malfunctions and therefore it is impossible to apply the brake hydraulic pressure to each of the wheel cylinders WC1 to WC4, the controller EC controls the cut valves 41 and 42 to be maintained in the open state so that the secondary port 12*b* of the master cylinder 12 is connected to the wheel cylinder WC1 provided at the front-left wheel FL while the primary port 12*a* of the master cylinder 12 is connected to the wheel cylinder WC2 provided at the front-right wheel FR. In addition, the controller EC controls the on-off valve 21 to be in the closed state so as to disconnect the secondary port 12*b* of the master cylinder 2 from the stroke simulator 22. Therefore, the brake hydraulic pressure generated at the master cylinder 12 is applied to the wheel cylinder WC1 provided at the front-left wheel FL and to the wheel cylinder WC2 provided at the front-right wheel FR via the cut valves 41 and 42 from the secondary port 12*b* and the primary port 12*a*, respectively.

When a locked state (wheel lock-up) of either one of the wheels FL, FR, RL, and RR is detected by the wheel speed sensor, and the like in a state where the hydraulic pressure supply source 30 is normally operated and therefore the brake hydraulic pressure is applied to each of the wheel cylinders WC1 to WC4, the controller EC controls and operates the pressure-increasing solenoid valves 43 to 46 and the pressure-decreasing solenoid valves 47 to 50. As a result, the brake hydraulic pressure at each of the wheel cylinders WC1 to WC4 is controlled to avoid the locked state of either one of the wheels FL, FR, RL, and RR (i.e., an anti-skid (ABS) control).

When a spin state of either the wheel FL or FR is detected by the vehicle speed sensor and the like upon an acceleration of the wheels FL and FR serving as driving wheels in a state where the brake pedal 13 is not operated, the controller EC controls and operates the pressure-increasing solenoid valves 43, 44 and the pressure-decreasing solenoid valves 47, 48. As a result, the brake hydraulic pressure at each of the wheel cylinders WC1 and WC2 is controlled to avoid the spin state of either the wheel FL or FR (i.e., a traction control (TRC)).

When an unstable state of the vehicle is detected by the yaw rate sensor, and the like, the controller EC controls and operates the pressure-increasing solenoid valves 43 to 46 and the pressure-decreasing solenoid valves 47 to 50. As a result, the brake hydraulic pressure at each of the wheel cylinders WC1 to WC4 is controlled to avoid the unstable state of the vehicle (i.e., a vehicle stability control or an electronic stability control (ESC)).

During the operation of the brake hydraulic pressure control apparatus 1 controlled by the controller EC in the aforementioned manner, valve elements of the pressure-decreasing solenoid valves 47 to 50 respectively are frequently operated to open and close. At this time, each of the valve elements is unbalanced and self-oscillation occurs thereat. The self-oscillation that occurs at one of the pressure-decreasing solenoid valves 47 to 50 generates pulsation of pressure at the relief passages 65 to 68 where the pressure-decreasing solenoid valves 47 to 50 are formed. However, the check valves 71 to 74 provided at the respective relief passages 65 to 68 prevent such pulsation of pressure. Accordingly, the pulsation of pressure caused by one of the pressure-decreasing solenoid valves 47 to 50 is prevented from being transmitted to the other pressure-decreasing solenoid valves 47 to 50.

The present embodiment includes the check valves 71 to 74 serving as the pulsation transmission decreasing devices at the respective relief passages 65 to 68 so as to decrease the transmission of pressure pulsation that occurs at the pressure-decreasing solenoid valves 47 to 50. Such simple structure prevents the transmission of pressure pulsation caused by the self-oscillation that occurs at one of the pressure-decreasing solenoid valves 47 to 50 to the other pressure-decreasing solenoid valves 47 to 50. As a result, the occurrence of self-oscillation at the multiple pressure-decreasing solenoid valves is prevented to thereby decrease the generation of operation noise.

In addition, the pressure-decreasing solenoid valves 47 to 50 are constituted by the linear solenoid valves. Thus, the amount of brake fluid flowing from each of the wheel cylinders WC1 to WC4 to the master cylinder reservoir 11 is controlled and the self-oscillation that occurs at each of the pressure-decreasing solenoid valves 47 to 50 is reduced by means of the check valves 71 to 74. The hydraulic pressure of the wheel cylinders WC1 to WC4 is therefore accurately controlled.

Figure 2:
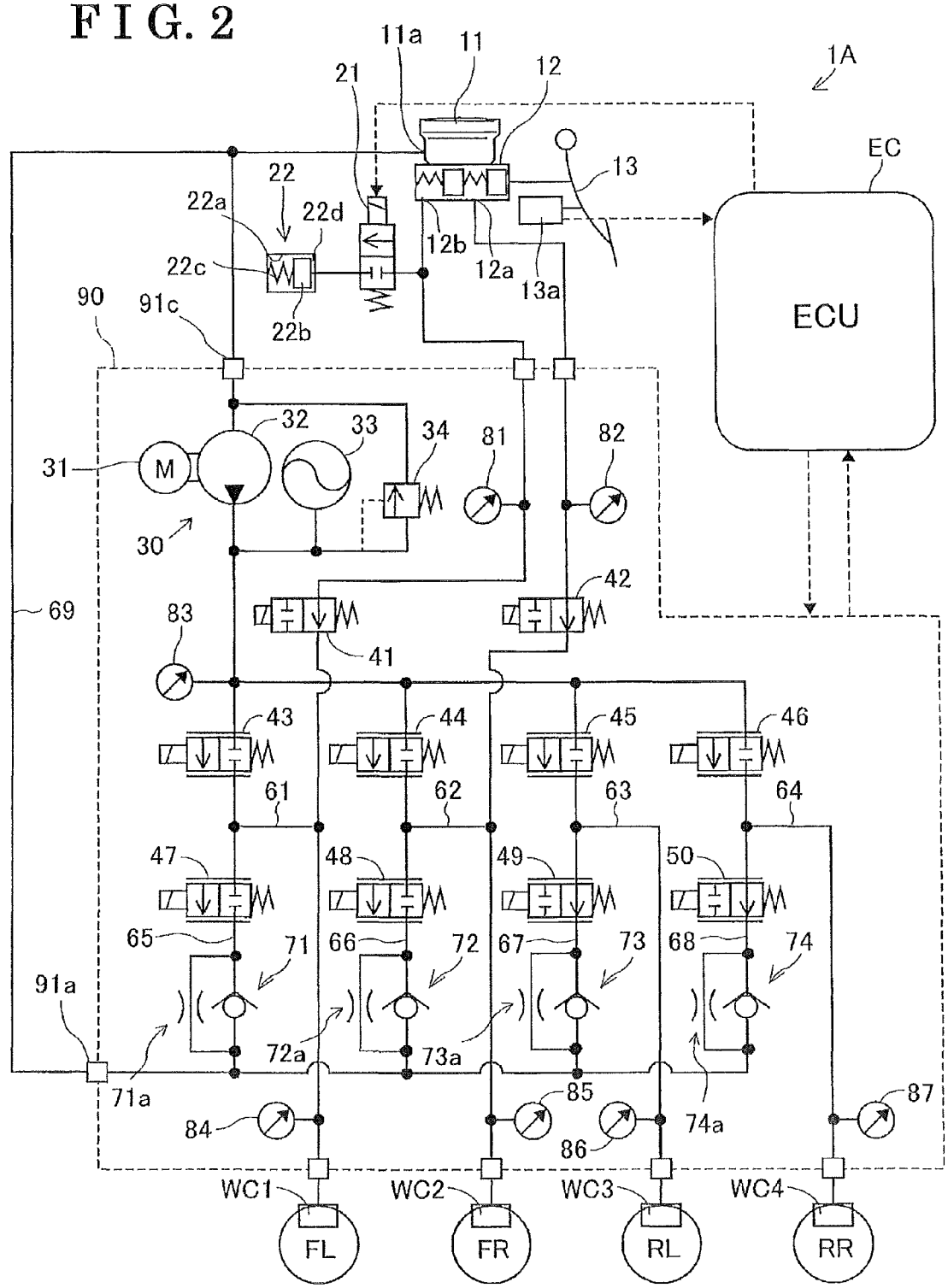
FIG. 2 is a diagram illustrating a brake hydraulic pressure control apparatus according to a second embodiment disclosed here.

A second embodiment will be explained with reference to FIG. 2. A brake hydraulic pressure control apparatus 1A according to the second embodiment is also a brake-by-wire type. The brake hydraulic pressure control apparatus 1A of the second embodiment differs from the brake hydraulic pressure control apparatus 1 of the first embodiment in that the brake hydraulic pressure control apparatus 1A includes orifices 71a, 72a, 73a, and 74a serving as throttle conduits and provided at the relief passages 65 to 68 so as to be in parallel to the respective check valves 71 to 74.

In a case where air bleeding is performed on the brake hydraulic pressure control apparatus 1A, including a filing of the brake fluid after air bleeding, the air is first removed from the master cylinder reservoir 11 by a usage of a vacuum pump. Then, while each of the valves is in the open state, the brake fluid is injected from the master cylinder reservoir 11.

In the case of filling the brake fluid, the brake fluid injected from the master cylinder reservoir 11 is sent to the wheel cylinder WC1 provided at the front-left wheel FL and the wheel cylinder WC2 provided at the front-right wheel FR via the master cylinder 12 and the cut valves 41 and 42. In addition, the brake fluid injected from the master cylinder reservoir 11 is sent to the wheel cylinder WC3 provided at the rear-left wheel RL, the wheel cylinder WC4 provided at the rear-right wheel RR, and the pressure-decreasing solenoid valves 47 to 50 via the hydraulic pressure supply source 30 and the pressure-increasing solenoid valves 43 to 46.

Further, the brake fluid injected from the master cylinder reservoir 11 flows through the circulating passage 69 and the orifices 71a to 74a provided at the respective relief passages 65 to 68 so that the brake fluid is also sent to the pressure-decreasing solenoid valves 47 to 50 in a direction opposite from the direction mentioned above. Cross-sectional areas (i.e., conduit areas) of the respective orifices 71a to 74a are defined in such a manner that the pulsation of pressure is prevented from being transmitted via the orifices 71a to 74a by restricting the brake fluid from flowing freely. Specifically, the cross-sectional areas of the respective orifices 71a to 74a are defined to be smaller than those of the relief passages 65 to 68.

According to the second embodiment, the orifices 71a to 74a are provided at the respective relief passages 65 to 68 so as to be in parallel to the check valves 71 to 74. Thus, when the brake fluid is injected from the master cylinder reservoir 11 upon the air bleeding of the brake hydraulic pressure control apparatus 1A, the brake fluid from the circulating passage 69 flows through the orifices 71a to 74a. The filling of the brake fluid is never interfered by the check valves 71 to 74. Accordingly, the air bleeding of the brake hydraulic pressure control apparatus 1A is performed for a short period of time.

Next, a third embodiment will be explained with reference to FIGS. 3 to 7. A brake hydraulic pressure control apparatus 1B according to the third embodiment is also a brake-by-wire type. The brake hydraulic pressure control apparatus 1B differs from the brake hydraulic pressure control apparatus 1A in that a first check valve 75, a second check valve 76, a third check valve 77, and a fourth check valve 78, all of which serve as the pulsation transmission decreasing devices and the check valves and all of which are provided at the relief passages 65 to 68, each have a predetermined valve opening pressure greater than zero in a direction towards the circulating passage 69 from the pressure-decreasing solenoid valves 47 to 50.

In addition, orifices 75a, 76a, 77a, and 78a are provided at the relief passages 65 to 68 respectively so as to be in parallel to the first to fourth check valves 75 to 78. The first check valve 75, the second check valve 76, the third check valve 77, and the fourth check valve 78 will be hereinafter referred to as the check valves 75 to 78 when being described collectively.

In the same way, the orifices 75a, 76a, 77a, and 78a will be hereinafter referred to as the orifices 75a to 78a when being described collectively.

In the same way as the second embodiment, the orifices 75a to 78a are provided to restrict the brake fluid from flowing freely. Specifically, cross-sectional areas of the respective orifices 75a to 78a provided in parallel to the check valves 75 to 78 are defined in such a manner that the pulsation of pressure is prevented from being transmitted via the orifices 75a to 78a and are smaller than cross-sectional areas of the relief passages 65 to 68.

Figure 4:
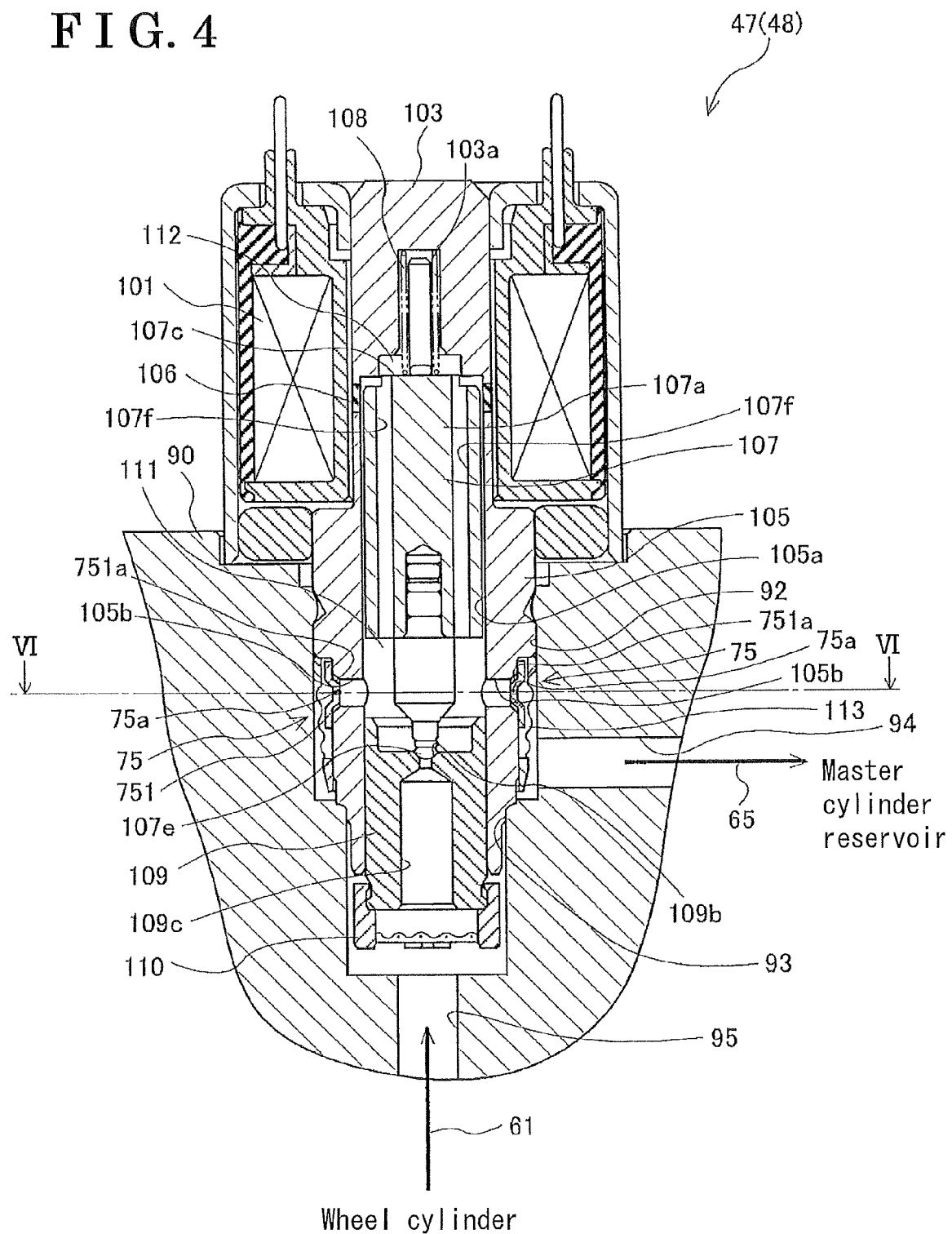
FIG. 4 is a cross-sectional view of a normally-closed pressure-decreasing solenoid valve shown in FIG. 3.

FIG. 4 is a cross-sectional view of the first pressure-decreasing solenoid valve 47 integrally provided with the first check valve 75 and the orifice 75a and mounted on the housing unit 90 according to the brake hydraulic pressure control apparatus 1B. In the following, an upper direction in FIG. 4 will be explained as an upper direction of the first pressure-decreasing solenoid valve 47. However, such direction is irrelevant to the actual direction of the first pressure-decreasing solenoid valve 47.

In the first pressure-decreasing solenoid valve 47, a solenoid 101 that generates an electromagnetic force when receiving an electric power is assembled on an outer periphery of a sleeve 105. A fixing member 103 is arranged at an inner radial side of the solenoid 101. Then, a joint 106 made by a nonmagnetic member is disposed between a lower end surface of the fixing member 103 and an upper end surface of the sleeve 105.

A plunger 107 is accommodated within an inner bore 105a of the sleeve 105 so as to be movable in an up and down direction as shown in FIG. 4. A void surrounded by a lower surface of the fixing member 103, the inner bore 105a, and an upper surface of a valve sheet 109, which will be explained later, serves as a valve chamber. A spring bore 103a is formed at the fixing member 103 so as to open at the lower surface thereof.

A coil spring 108 serving as a valve element pressing device is disposed between an inner peripheral surface of the spring bore 103a and a plunger body 107a so as to expand and contract in up and down direction in FIG. 4. An upper end of the coil spring 108 makes contact with a top surface of the spring bore 103a while a lower end of the coil spring 108 makes contact with a shoulder portion 107c of the plunger 107. Accordingly, the plunger 107 is constantly biased by the coil spring 108 in a vertically lower direction in FIG. 4.

A valve element 107e is concentrically mounted at a lower end of the plunger body 107a. At least a lower surface of the valve element 107e is formed into a spherical shape. A valve seat 109 having substantially a cylindrical shape is press-fitted to the inner bore 105a of the sleeve 105 from a lower end thereof. A pressure-decreasing port 109c serving as an oil port is formed at the valve seat 109 so as to open downward in FIG. 4. The pressure-decreasing port 109c is connected to a plunger chamber 111, which will be explained later, via a seat portion 109b.

The plunger 107 is constantly pressed downward in FIG. 4 relative to the fixing member 103 by the biasing force of the coil spring 108. Thus, the valve element 107e formed at the lower end of the plunger 107 engages with the seat portion 109b of the valve seat 109 so as to disconnect a communication between the pressure-decreasing port 109c and the plunger chamber 111. Further, a filter 110 is attached to a lower end of the valve seat 109.

According to the aforementioned structure, the plunger chamber 111 is defined by the inner bore 105a of the sleeve 105, a lower surface of the plunger body 107a, and the upper surface of the valve seat 109. In addition, a deflection chamber 112 is defined between the lower surface of the fixing member 103 and an upper surface of the plunger body 107a. In order to allow the flowing of the brake fluid between the plunger chamber 111 and the deflection chamber 112 in association with the movement of the plunger 107 in the up and down direction as shown in FIG. 4, multiple connection grooves 107f are formed to penetrate through the plunger body 107a in the up and down direction. The plunger chamber 111 and the deflection chamber 112 collectively serve as the valve chamber.

Figure 3:
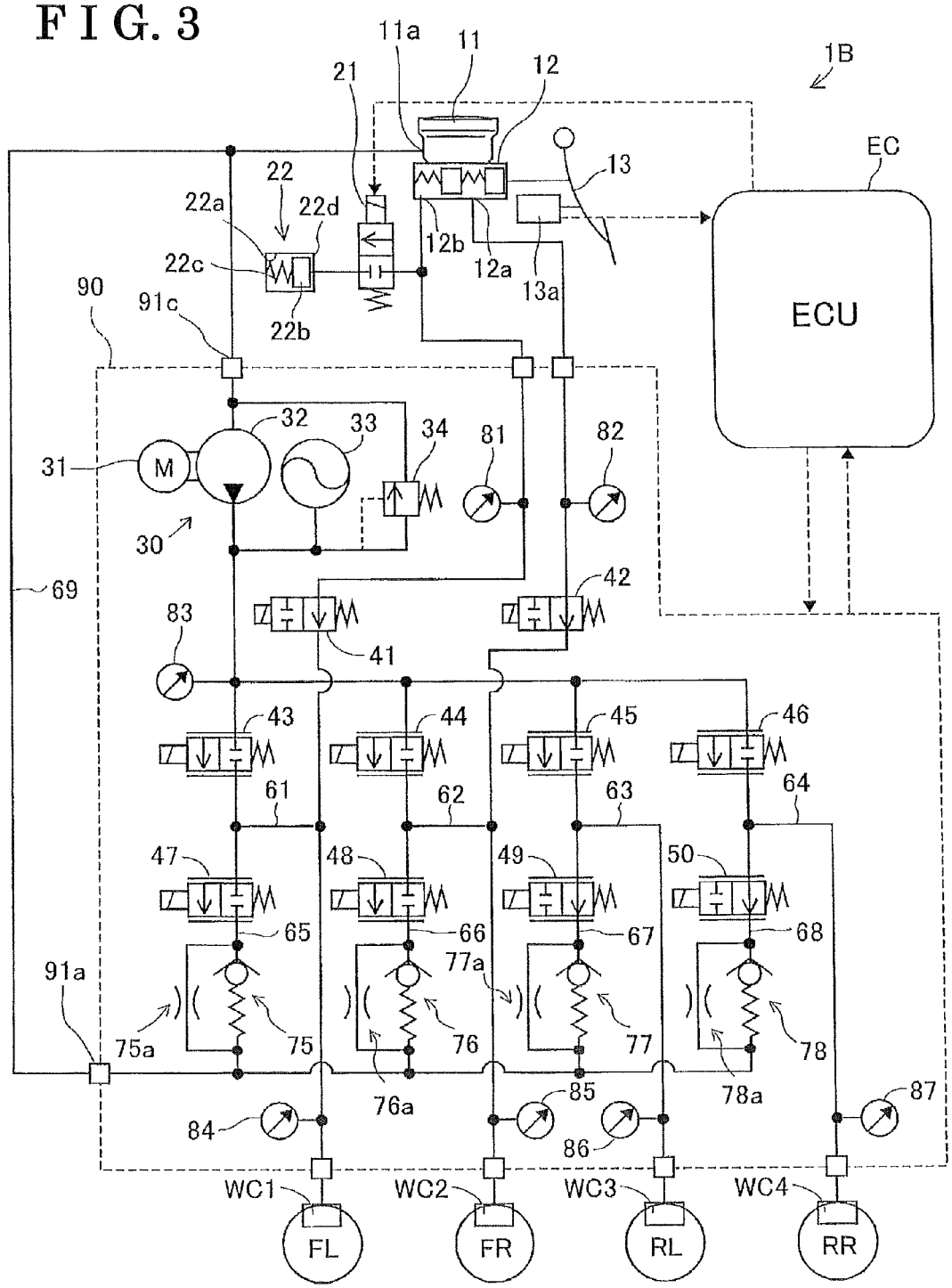
FIG. 3 is a diagram illustrating a brake hydraulic pressure control apparatus according to a third embodiment disclosed here.

A pair of discharge ports 105b serving as relief ports are formed at the sleeve 105 so as to open at the outer periphery thereof. The pair of discharge ports 105b is provided to connect the plunger chamber 111 to the outside of the sleeve 105. In addition, the first check valve 75 illustrated in FIG. 3 is formed at a position on the outer periphery of the sleeve 105 so as to cover the pair of discharge ports 105b. Further, a cylindrical-shaped filter 113 is attached to a radially outer side of the first check valve 75 so as to cover the pair of discharge ports 105b.

As illustrated in FIG. 4, a large diameter insertion bore 92 and a small diameter insertion bore 93 are formed at the housing unit 90 into which each of the pressure-decreasing solenoid valves 47 to 50 is inserted. The outer periphery of the sleeve 105 is press-fitted to the large diameter insertion bore 92 and the small diameter insertion bore 93 so that the first pressure-decreasing solenoid valve 47 is mounted on the housing unit 90.

An outlet conduit 94 constituting a portion of the first relief passage 65 is formed, opening at an inner peripheral surface of the large diameter insertion bore 92. An inlet conduit 95 constituting a portion of the first wheel cylinder passage 61 is formed, opening at a bottom surface of the small diameter insertion bore 93. The outer periphery of the sleeve 105 and both of the larger diameter insertion bore 92 and the small diameter insertion bore 93 are fluid-tightly fitted to each other. Accordingly, the inlet conduit 95 is connected to the outlet conduit 94 via the pressure-decreasing port 109c, a valve portion constituted by the valve element 107e and the seat portion 109b, the plunger chamber 111 and the discharge ports 105b.

In the aforementioned first pressure-decreasing solenoid valve 47, the plunger 107 is constantly pressed downward in FIG. 4 by the biasing force of the coil spring 108. Thus, in a case where the solenoid 101 is not supplied with the electric power, the valve element 107e of the plunger 107 that is pressed by the coil spring 108 engages with the seat portion 109b, thereby disconnecting a communication between the plunger chamber 111 and the pressure-decreasing port 109c.

The solenoid 101 generates the electromagnetic force when being powered to thereby bias the plunger 107 in the upper direction in FIG. 4 against the pressing force of the coil spring 108. Thus, the engagement of the valve element 107e of the plunger 107 with the seat portion 109b is released to thereby connect the plunger chamber 111 to the pressure-decreasing port 109c. The solenoid 101 generates the electromagnetic force depending on the drive current value supplied to the solenoid 101. Therefore, a lifting amount of the valve element 107e relative to the seat portion 109b is variable by a change of power supply to the solenoid 101. The control of the drive current value supplied to the solenoid 101 achieves the adjustment of the amount of brake fluid flowing to the plunger chamber 111 from the pressure-decreasing port 10c and further the control of the brake hydraulic pressure at the inlet conduit 95.

That is, the first pressure-decreasing solenoid valve 47 is operated depending on a load balance between the electromagnetic force, generated by the solenoid 101 and acting on the plunger 107, the pressure difference of the brake fluid, and the biasing force of the coil spring 108. As a result, the brake hydraulic pressure is adjusted at the wheel cylinder WC1. The operation of the first pressure-decreasing solenoid valve 47 in the aforementioned manner achieves the smooth pressure reduction of the brake hydraulic pressure at the wheel cylinder WC1 in a case of the brake operation under a normal driving condition of the vehicle, without a generation of the operation noise.

Figure 5:
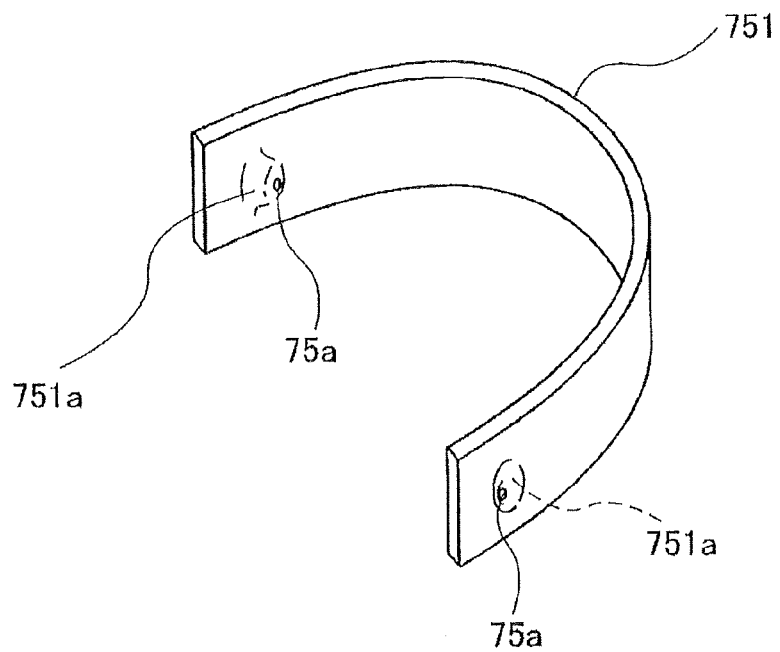
FIG. 5 is a perspective view of a valve member shown in FIG. 4.
Figure 6:
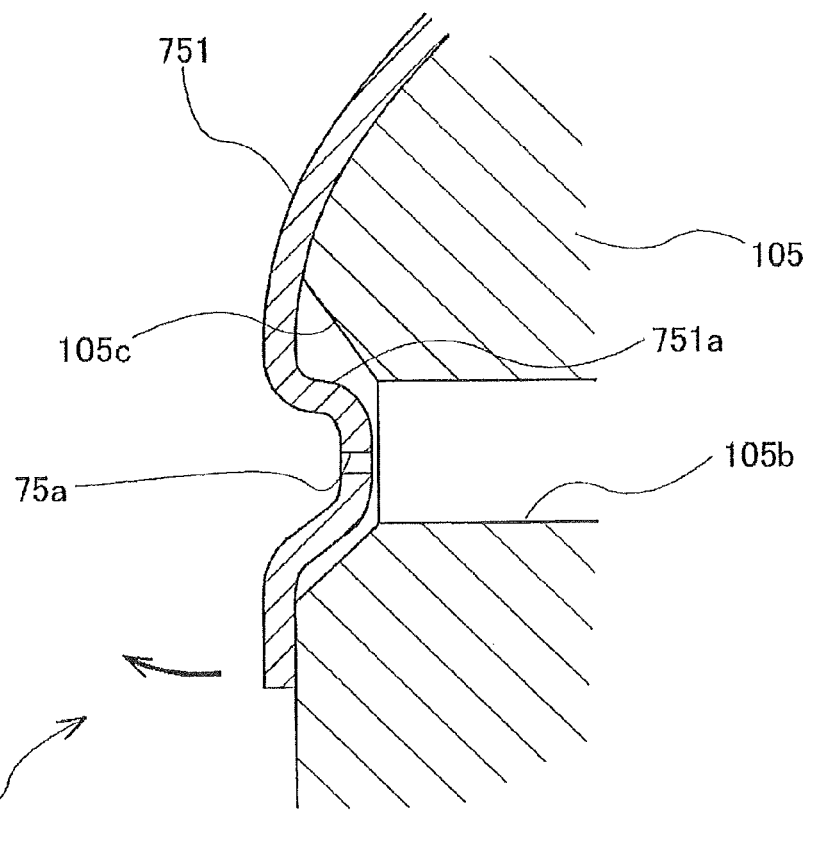
FIG. 6 is a partially enlarged view of the pressure-decreasing solenoid valve taken along line VI-VI in FIG. 4.

FIG. 5 is a perspective view of a valve member 751 that constitutes the first check valve 75. FIG. 6 is a cross-sectional view of the valve member 751 attached to the outer periphery of the sleeve 105. The valve member 751 serving as a biasing member is formed into an arc shape obtained by a strip-shaped metallic spring member having flexibility and is formed into substantially a C-shape. The valve member 751 includes a predetermined curvature so as to be assembled on the outer periphery of the sleeve 105. Both ends of the valve member 751 include engagement portions 751a, respectively, so as to project in the radially inward direction of the sleeve 105. The two engagement portions 751a are positioned to face each other relative to a center of a imaginary perfect circle having the same curvature of that of the valve member 751.

Each of the engagement portions 751a includes an outer diameter and a depth so as to be received within a tapered opening portion 105c of the discharge port 105b formed at the sleeve 105. Because the engagement portions 751a are received within the respective opening portions 105c, the positioning of the valve member 751 at the outer periphery of the sleeve 105 is determined as illustrated in FIG. 6. Both ends of the valve member 751 attached to the outer periphery of the sleeve 105 are normally in contact with the outer periphery of the sleeve 105 so as to cover the respective discharge ports 105b. The valve member 751 may be formed by a wire rod having elasticity instead of the strip-shaped spring member. Alternatively, the valve member 751 may be formed by spring steel or synthetic resin material. The orifice 75a, which will be explained later, may be formed at only one of the engagement portions 751a.

In a case where the brake hydraulic pressure equal to or greater than a predetermined value (i.e., greater than zero) is generated at the plunger chamber 111, the brake hydraulic pressure is applied to the valve member 751 via the discharge ports 105b. The end portions of the valve member 751 are deflected so that the valve member 751 expands in a radially outward direction of the sleeve 105. As a result, the end portions of the valve member 751 are separated from the outer periphery of the sleeve 105, thereby opening the first check valve 75 and opening the discharge ports 105b towards the outlet conduit 94. The valve opening pressure of the first check valve 75 is specified to be an appropriate value greater than zero by a change of deformation rigidity of the valve member 751.

In a case where the hydraulic pressure is applied from the outlet conduit 94, the end portions of the valve member 751 are prevented from being separated from the outer periphery of the sleeve 105, thereby maintaining the first check valve 75 in the closed state. Thus, even when the pulsation of pressure acts towards the first pressure-decreasing solenoid valve 47 from the circulating passage 69, the pulsation of pressure is interfered by the first check valve 75 and is prevented from being transmitted to the plunger chamber 111 or the deflection chamber 112. The plunger 107 is never vibrated or oscillated accordingly. The orifice 75a is formed in a penetrating manner at a top surface of each of the engagement portions 751*a* of the valve member 751 positioned in a most radially inner direction of the sleeve 105. Accordingly, even when the first check valve 75 is closed, each of the discharge ports 105*b* and the outlet conduit 94 is connected to each other by the orifice 75*a* as illustrated in FIG. 6.

As mentioned above, the first pressure-decreasing solenoid valve 47 integrally formed with the first check valve 75 includes the orifice 75*a* but still dynamically retains (i.e., while the first pressure-decreasing solenoid valve 47 is operating) a residual pressure equal to or greater than the aforementioned predetermined value (i.e., the predetermined pressure value). In the same way as the first pressure-decreasing solenoid valve 47 explained in the above, the normally-closed second pressure-decreasing solenoid valve 48 is also integrally formed with the second check valve 76 and the orifice 76*a* and has the same structure as that of the first pressure-decreasing solenoid valve 47.

Figure 7:
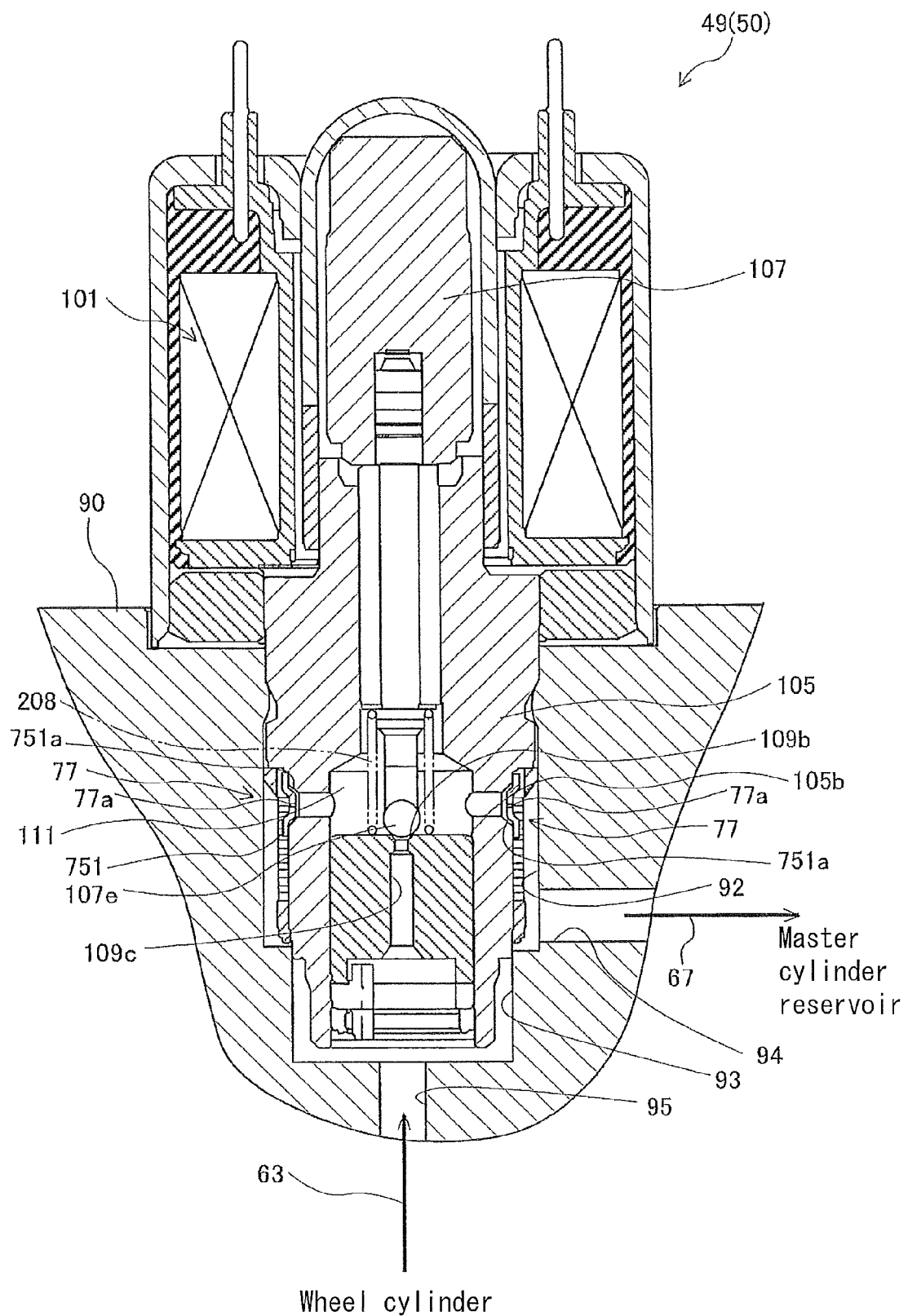
FIG. 7 is a cross-sectional view of a normally-open pressure-decreasing solenoid valve shown in FIG. 3.

In FIG. 7, structures of the normally-open third pressure-decreasing solenoid valve 49 and the fourth pressure-decreasing solenoid valve 50 bear the same numeral references as those of the first pressure-decreasing solenoid valve 47 illustrated in FIG. 4. Only differences of the third and fourth pressure-decreasing solenoid valves 49 and 50 from the first pressure-decreasing solenoid valve 47 will be explained below. In the third pressure-decreasing solenoid valve 49, the plunger 107 is constantly pressed upward in FIG. 7 by a biasing force of a coil spring 208 serving as the valve element pressing device. Thus, in a case where the solenoid 101 is not supplied with the electric power, the valve element 107*e* of the plunger 107 that is pressed by the coil spring 208 is separated from the seat portion 109*b* so that the plunger chamber 111 and the pressure-decreasing port 109*c* are connected to each other.

The solenoid 101 generates the electromagnetic force when being powered so as to press the plunger 107 downward in FIG. 7 against the biasing force of the coil spring 208. Then, the valve element 107*e* is seated on the seat portion 109*b* so as to disconnect the plunger chamber 111 from the pressure-decreasing port 109*c*. The solenoid 101 generates the electromagnetic force depending on the drive current value supplied to the solenoid 101. Thus, the control of the drive current achieves the control of the brake hydraulic pressure applied to the third wheel cylinder WC3 connected to the inlet passage 95.

According to the third embodiment, each of the check valves 75 to 78 includes the predetermined valve opening pressure greater than zero in a direction towards the circulating passage 69 from each of the pressure-decreasing solenoid valves 47 to 50. While the pressure-decreasing solenoid valves 47 to 50 are operating, a predetermined hydraulic pressure is generated at the plunger chamber 111 and the deflection chamber 112 of each of the pressure-decreasing solenoid valves 47 to 50 so as to prevent a generation of air bubbles caused by aeration within the plunger chamber 111 and the deflection chamber 112 and to damp oscillations of the valve element 107*e*. As a result, the self-oscillation of each of the pressure-decreasing solenoid valves 47 to 50 is reduced to thereby prevent an occurrence of the operation noise of the brake hydraulic pressure control apparatus 1B.

In addition, the wheel cylinder WC3 provided at the rear-left wheel RL and the wheel cylinder WC4 provided at the rear-right wheel RR are constantly connected to the master cylinder reservoir 11 by means of the orifices 77*a* and 78*a*. Thus, the brake hydraulic pressure at each of the wheel cylinders WC3 and WC4 is zero in a state where the brake hydraulic pressure control apparatus 1B is not operated, thereby preventing dragging of the wheels RL and RR caused by the residual pressure at the wheel cylinders WC3 and WC4.

Each of the check valves 75 to 78 includes the valve member 751 formed by an arc-shaped elastic member having flexibility. The end portions of the valve member 751 cover the discharge ports 105*b*. Each of the orifices 75*a* to 78*a* formed at the end portions of the valve member 751 causes the plunger chamber 111 and each of the relief passages 65 to 68 to communicate with each other. The valve member 751 where the orifices 75*a* to 78*a* are formed is simply attached to the outer periphery of the sleeve 105 to thereby integrally form each of the check valves 75 to 78 with each of the pressure-decreasing solenoid valves 47 to 50. The small-sized and low cost brake hydraulic pressure control apparatus 1B may be achieved accordingly.

Figure 8:
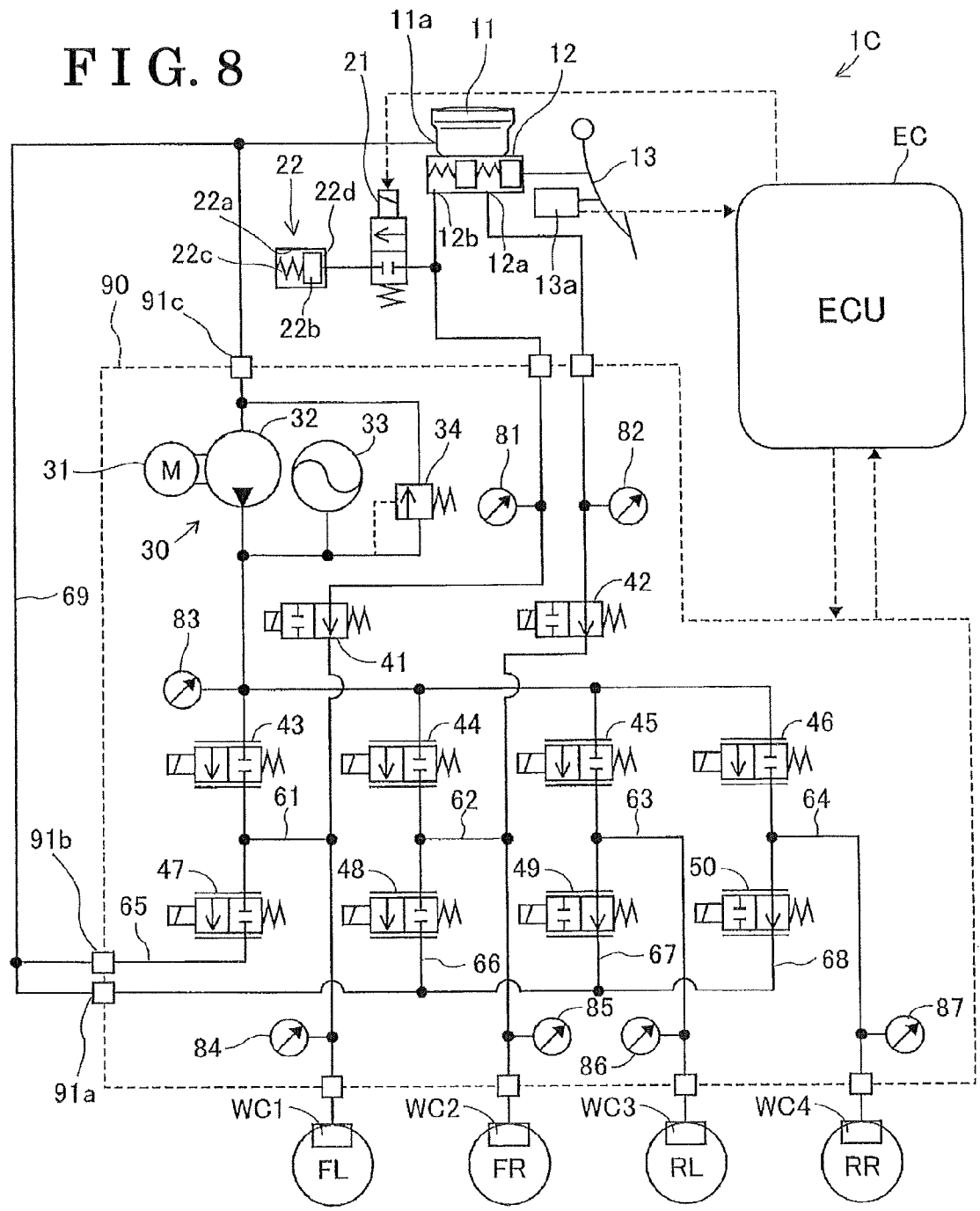
FIG. 8 is a diagram illustrating a brake hydraulic pressure control apparatus according to a fourth embodiment disclosed here.

A brake hydraulic pressure control apparatus 1C according to a fourth embodiment will be explained with reference to FIG. 8. The brake hydraulic pressure control apparatus 1C differs from the brake hydraulic pressure control apparatus 1 of the first embodiment in that the check valves 71 to 74 are not provided at the relief passages 65 to 68, and the first relief passage 65 where the first pressure-decreasing solenoid valve 47 is provided extends from the first pressure-decreasing solenoid valve 47 through the inner portion of the housing unit 90 and runs to outside thereof so as to be connected to the circulating passage 69 as illustrated in FIG. 8. At this time, the first relief passage 65 may be directly connected to the master cylinder reservoir 11.

As illustrated in FIG. 8, the circulating passage 69 extends through the inner portion of the housing unit 90 in the same way as that of the first embodiment and then runs to outside thereof from the first drain port 91*a* so as to be connected to the input port 11*a* of the master cylinder reservoir 11. The second, third and fourth relief passages 66, 67, and 68 where the second, third, and fourth pressure-decreasing solenoid valves 47, 48, and 49 are formed respectively are connected to the circulating passage 69 within the housing unit 90.

The first relief passage 65 extends through the inner portion of the housing unit 90 from the first pressure-decreasing solenoid valve 47, and then runs to outside of the housing unit 90 from a second drain port 91*b* formed at the outer peripheral surface of the housing unit 90 so as to be connected to the circulating passage 69 outside of the housing unit 90. Thus, according to the fourth embodiment, the second drain port 91*b* and the inlet port 91*c* formed at the outer periphery of the housing unit 90 and connected to the suction port of the hydraulic pump 32 are connected to each other outside of the housing unit 90. At this time, a connection point between the first relief passage 65 and the circulating passage 69 formed at the outside of the housing unit 90 is desirably provided closer to the master cylinder reservoir 11 in view of reducing transmission of pressure pulsation caused by the self-oscillation of the first pressure-decreasing solenoid valve 47.

In the brake hydraulic pressure control apparatus 1C illustrated in FIG. 8, only the first relief passage 65 where the first pressure-decreasing solenoid valve 47 is formed is connected to the circulating passage 69 outside of the housing unit 90. Alternatively, in addition to the first relief passage 65, or instead of the first relief passage 65, at least one of the relief passages 66 to 68 may be connected to the circulating passage 69 outside of the housing unit 90. Further alternatively, all of the relief passages 65 to 68 may be individually connected to the circulating passage 69 or to the master cylinder reservoir 11 outside of the housing unit 90. Further alternatively, one of or plurality of the relief passages 65 to 68 may be directly connected to the master cylinder 11 outside of the housing unit 90 instead of being connected to the circulating passage 69.

According to the fourth embodiment, the first relief passage 65 extends from the first pressure-decreasing solenoid valve 47 within the housing unit 90 and runs to outside thereof so as to be connected to the circulating passage 69. Thus, the connection point between the first relief passage 65 and the circulating passage 69 is away from the pressure-decreasing solenoid valves 48 to 50 provided at the other relief passages 66 to 68. As a result, the pulsation of pressure from the first pressure-decreasing solenoid valve 47 to the other pressure-decreasing solenoid valves 48 to 50 is damped, thereby decreasing the transmission of pressure pulsation caused by the self-oscillation of the first pressure-decreasing solenoid valve 47. The occurrence of operation noise of the brake hydraulic pressure control apparatus is reduced accordingly.

The first to fourth embodiments are not limited to have the aforementioned structures and may be modified or changed appropriately. For example, the brake hydraulic pressure control apparatus according to any one of the embodiments is applicable to a front-wheel-drive vehicle, a rear-wheel-drive vehicle, and four-wheel-drive vehicle, without being restricted by a driving system of the vehicle.

In addition, the brake hydraulic pressure control apparatus according to any one of the embodiments is not only applicable to a braking system performing all of the anti-skid control, the traction control, and the vehicle stability control in addition to the normal brake control but also applicable to the braking system performing one of or some of the aforementioned controls. The master cylinder reservoir 11 may be integrally formed with the master cylinder 12 as illustrated in FIG. 1, or formed separately from the master cylinder 12 and connected thereto by means of a hose, or the like.

According to the aforementioned brake hydraulic pressure control apparatus 1, 1A, 1B, 1C, the check valves 71 to 74, 75 to 78 (the pulsation transmission decreasing device) are provided at the relief passages 65 to 68 respectively for decreasing the transmission of pressure pulsation that occurs at least one of the pressure-decreasing solenoid valves 47 to 50. Thus, such simple structure enables a prevention of the self-oscillation that occurs at one of the pressure-decreasing solenoid valves 47 to 50 from being transmitted to the other pressure-decreasing solenoid valve(s) 47 to 50. The amplification caused by a mutual interference of the self-oscillation between the pressure-decreasing solenoid valves 47 to 50 is reduced, thereby decreasing a generation of an operation noise of the brake hydraulic pressure control apparatus 1, 1A, 1B, 1C.

The pulsation transmission decreasing device includes the check valves 71 to 74, 75 to 78 provided at the relief passages 65 to 68 respectively. The check valves 71 to 74, 75 to 78 allow the brake fluid to flow in a direction from the pressure-decreasing solenoid valves 47 to 50 to the circulating passage 69 and prohibit the brake fluid to flow in a direction from the circulating passage 69 to the pressure-decreasing solenoid valves 47 to 50.

According to the aforementioned brake hydraulic pressure control apparatus 1, 1A, 1B, the check valves 71 to 74, 75 to 78 prevent the transmission of pressure pulsation that occurs at the one of the pressure-decreasing solenoid valves 47 to 50 to the other pressure-decreasing solenoid valve(s) 47 to 50. Therefore, such simple structure achieves a reduction of the operation noise.

The orifices 71a to 74a, 75a to 78a restricting the flow of the brake fluid are provided at the relief passages 65 to 68 respectively in parallel to the respective check valves 71 to 74, 75 to 78.

Because the orifices 71a to 74a, 75a to 78a are provided at the respective relief passages 65 to 68 so as to be in parallel to the check valves 71 to 74, 75 to 78, the brake fluid passes and flows through the orifices 71a to 74a, 75a to 78a at the relief passages 65 to 68 via the circulating passage 69 in a case where the brake fluid is injected from the reservoir 11 of the master cylinder 12 upon air bleeding of the brake hydraulic pressure control apparatus 1A, 1B. The check valves 71 to 74, 75 to 78 never interfere with the filling of the brake fluid. Therefore, the air bleeding of the brake hydraulic pressure control apparatus 1A, 1B is achieved for a short period of time. At this time, a conduit area of each of the orifices 71a to 74a, 75a to 78a provided in parallel to each of the check valves 71 to 74, 75 to 78 is defined in such a manner that the pulsation of pressure is prevented from being transmitted via the orifices 71a to 74a, 75a to 78a by restricting the brake fluid from flowing freely.

The check valves 75 to 78 each include a predetermined valve opening pressure greater than zero in a direction from each of the pressure-decreasing solenoid valves 47 to 50 to the circulating passage 69.

Accordingly, a predetermined hydraulic pressure is generated within the valve chamber of each of the pressure-decreasing solenoid valves 47 to 50 while each of the pressure-decreasing solenoid valves 47 to 50 is operating. Then, for example, a generation of air bubbles caused by aeration is restrained so as to damp oscillations of the valve element 107e of each of the pressure-decreasing solenoid valves 47 to 50. As a result, the self-oscillation of the valve element 107e is decreased to prevent the operation noise of the brake hydraulic pressure control apparatus 1B. In addition, the wheel cylinders WC1 to WC4 and the reservoir 11 are connected to each other by means of the orifices 75a to 78a. Thus, dragging of the wheels FL, FR, RL, and RR caused by a residual pressure at the wheel cylinders WC1 to WC4 may be prevented.

Each of the pressure-decreasing solenoid valves 47 to 50 includes the valve chamber (the plunger chamber 111 and deflection chamber 112) connected to the relief port 105b that is connected to one of the relief passages 65 to 68 and the oil port 109c that is connected to one of the wheel cylinders WC1 to WC4, the relief port 105b and the oil port 109c opening to an outside of the pressure-decreasing solenoid valve 47, 48, 49, 50, the valve seat 109b being formed at a connecting portion of the valve chamber (the plunger chamber 111 and deflection chamber 112) to the oil port 109c, the valve element 107e movably accommodated within the valve chamber (the plunger chamber 111 and deflection chamber 112) and disconnecting the valve chamber (the plunger chamber 111 and deflection chamber 112) and the oil port 109c by making contact with the valve seat 109b, the coil spring 108, 208 biasing the valve element 107e in a direction approaching the valve seat 109b or separating from the valve seat 109b, and the solenoid 101 generating an electromagnetic force by being supplied with an electric power and biasing the valve element 107e in a direction against a pressing force of the coil spring 108, 208. Each of the check valves 75 to 78 is formed by an arc-shaped biasing member having flexibility and the orifice 75a, 76a, 77a, 78a is formed at least one end portion of the biasing member, the biasing member being attached to an outer periphery of the pressure-decreasing solenoid valve 47, 48, 49, 50 so that the one end portion of the biasing member covers the relief port 105b while the orifice 75a, 76a, 77a, 78a causes the valve chamber (the plunger chamber 111 and deflection chamber 112) to be connected to the relief passage 65, 66, 67, 68. When the brake hydraulic pressure equal to or greater than a predetermined value is generated within the valve chamber (the plunger chamber 111 and deflection chamber 112), the one end is deflected in a radially outward direction of the pressure-decreasing solenoid valve 47, 48, 49, 50 to open the relief port 105b towards the relief passage 65, 66, 67, 68.

The biasing member (the check valve) is simply attached to the outer periphery of each of the pressure-solenoid valves 47 to 50 to thereby integrally form each of the check valves 75 to 48 having the valve opening pressure with each of the pressure-decreasing solenoid valves 47 to 50. The brake hydraulic pressure control apparatus 1B is achieved at a low cost.

The brake hydraulic pressure control apparatus 1C further includes a housing unit 90 in which at least the pressure-increasing solenoid valves 43 to 46, the pressure-decreasing solenoid valves 47 to 50, and the cut valves 41 and 42 are formed. The pulsation transmission decreasing device is configured in such a manner that the circulating passage 69 extends through an inner portion of the housing unit 90 and runs to outside thereof to be connected to the reservoir 11, and at least one of the relief passages 65 to 68 extends through the inner portion of the housing unit 90 from at least one of the pressure-decreasing solenoid valves 47 to 50 and runs to outside thereof to be connected to either the circulating passage 69 or the reservoir 11.

The connecting point between one of the relief passages 65 to 68 and the circulating passage 69 or between one of the relief passages 65 to 68 and the reservoir 11 is away from the pressure-decreasing solenoid valves 47 to 50 provided at the other relief passages 65 to 68. Thus, the pressure pulsation from at least one of the pressure-decreasing solenoid valves 47 to 50 to the other pressure-decreasing solenoid valve(s) 47 to 50 is damped by one of the relief passages 65 to 68 that is connected to the circulating passage 69 or the reservoir 11 outside the housing unit 90. Thus, the transmission of pressure caused by the self-oscillation is reduced, thereby decreasing the occurrence of the operation noise.

The brake hydraulic pressure control apparatus 1C further includes a housing unit 90 in which at least the pressure-increasing solenoid valves 43 to 46, the pressure-decreasing solenoid valves 47 to 50, and the cut valves 41 and 42 are formed. The pulsation transmission decreasing device is configured in such a manner that all of the relief passages 65 to 68 extend through an inner portion of the housing unit 90 from downstream sides of the pressure-decreasing solenoid valves 47 to 50 and run to outside of the housing unit 90 to be connected to either the circulating passage 69 or the reservoir 11.

The connecting points between all the relief passages 65 to 68 and the circulating passage 69 or between all the relief passages 65 to 68 and the reservoir 11 are away from all the pressure-decreasing solenoid valves 47 to 50 provided at the respective relief passages 65 to 68. Thus, the pressure pulsation from one of the pressure-decreasing solenoid valves 47 to 50 to the other pressure-decreasing solenoid valve(s) 47 to 50 is damped by the relief passages 65 to 68 that are connected to the circulating passage 69 or the reservoir 11 outside the housing unit 90. Thus, the transmission of pressure caused by the self-oscillation is reduced at all of the relief passages 65 to 68, thereby decreasing the occurrence of the operation noise.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A brake hydraulic pressure control apparatus comprising:
   a reservoir storing a brake fluid at an inner portion connected to atmospheric air;
   a brake hydraulic pressure supply device connected to the reservoir and pressurizing the brake fluid that is supplied by the reservoir in response to an operation of a brake pedal;
   a hydraulic pump suctioning the brake fluid within the reservoir and discharging the brake fluid having a predetermined brake hydraulic pressure;
   a plurality of wheel cylinders provided at a plurality of wheels of a vehicle respectively and connected to the brake hydraulic pressure supply device, each of the plurality of wheel cylinders generating a braking force at each of the wheels by receiving the brake hydraulic pressure from the hydraulic pump;
   a cut valve provided between the brake hydraulic pressure supply device and the plurality of wheel cylinders and disconnecting the brake hydraulic pressure supply device from the plurality of wheel cylinders;
   a plurality of pressure-increasing solenoid valves provided between the hydraulic pump and the respective wheel cylinders, the plurality of pressure-increasing solenoid valves connecting and disconnecting the hydraulic pump relative to the respective wheel cylinders by opening and closing;
   a plurality of pressure-decreasing solenoid valves connected to the respective wheel cylinders and opening and closing, the pressure-decreasing solenoid valves being formed by linear solenoid valves respectively;
   a discharge passage including a plurality of relief passages of which first ends are connected to downstream sides of the pressure-decreasing solenoid valves respectively and a circulating passage connecting second ends of the plurality of relief passages to the reservoir;
   a controlling device controlling the brake fluid within the wheel cylinders to be a predetermined value in response to an operating level of the brake hydraulic pressure supply device in a case where the brake hydraulic pressure supply device is operated, the controlling device bringing the brake hydraulic pressure to be applied to the wheel cylinders from the hydraulic pump by disconnecting the brake hydraulic pressure supply device from the wheel cylinders by the cut valve while the pressure-increasing solenoid valves are each in an open state, and bringing the brake fluid within the wheel cylinders to be circulated to the reservoir via the discharge passage by operating the pressure-decreasing solenoid valves; and
   a pulsation transmission decreasing device provided at the discharge passage and decreasing a transmission of a pressure pulsation generated by at least one of the pressure-decreasing solenoid valves.

2. The brake hydraulic pressure control apparatus according to claim 1, wherein the pulsation transmission decreasing device includes check valves provided at the relief passages respectively, the check valves allowing the brake fluid to flow in a direction from the pressure-decreasing solenoid valves to the circulating passage and prohibiting the brake fluid to flow in a direction from the circulating passage to the pressure-decreasing solenoid valves.

3. The brake hydraulic pressure control apparatus according to claim 2, wherein orifices restricting the flow of the brake fluid are provided at the relief passages respectively in parallel to the respective check valves.

4. The brake hydraulic pressure control apparatus according to claim 3, wherein the check valves each include a predetermined valve opening pressure greater than zero in a direction from each of the pressure-decreasing solenoid valves to the circulating passage.

5. The brake hydraulic pressure control apparatus according to claim 4, wherein each of the pressure-decreasing solenoid valves includes:
   a valve chamber connected to a relief port that is connected to one of the relief passages and an oil port that is connected to one of the wheel cylinders, the relief port and the oil port opening to an outside of the pressure-decreasing solenoid valve, a valve seat being formed at a connecting portion of the valve chamber to the oil port;
   a valve element movably accommodated within the valve chamber and disconnecting the valve chamber and the oil port by making contact with the valve seat;
   a valve element pressing device biasing the valve element in a direction approaching the valve seat or separating from the valve seat; and
   a solenoid generating an electromagnetic force by being supplied with an electric power and biasing the valve element in a direction against a pressing force of the valve element pressing device; wherein
each of the check valves is formed by an arc-shaped biasing member having flexibility and the orifice is formed at least one end portion of the biasing member, the biasing member being attached to an outer periphery of the pressure-decreasing solenoid valve so that the one end portion of the biasing member covers the relief port while the orifice causes the valve chamber to be connected to the relief passage, and wherein
   when the brake hydraulic pressure equal to or greater than a predetermined value is generated within the valve chamber, the one end is deflected in a radially outward direction of the pressure-decreasing solenoid valve to open the relief port towards the relief passage.

6. The brake hydraulic pressure control apparatus according to claim 1, further comprising a housing unit in which at least the pressure-increasing solenoid valves, the pressure-decreasing solenoid valves, and the cut valve are formed, wherein the pulsation transmission decreasing device is configured in such a manner that the circulating passage extends through an inner portion of the housing unit and runs to outside thereof to be connected to the reservoir, and at least one of the relief passages extends through the inner portion of the housing unit from at least one of the pressure-decreasing solenoid valves and runts to outside thereof to be connected to either the circulating passage or the reservoir.

7. The brake hydraulic pressure control apparatus according to claim 1, further comprising a housing unit in which at least the pressure-increasing solenoid valves, the pressure-decreasing solenoid valves, and the cut valve are formed, wherein the pulsation transmission decreasing device is configured in such a manner that all of the relief passages extend through an inner portion of the housing unit from downstream sides of the pressure-decreasing solenoid valves and run to outside of the housing unit to be connected to either the circulating passage or the reservoir.

* * * * *